(12) United States Patent
Marshall et al.

(10) Patent No.: US 7,174,136 B2
(45) Date of Patent: Feb. 6, 2007

(54) DIRECT CONVERSION RADIO TRANSCEIVER

(75) Inventors: Paul R. Marshall, Redhill (GB); Anthony D. Sayers, Crawley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1098 days.

(21) Appl. No.: 10/082,866

(22) Filed: Oct. 19, 2001

(65) Prior Publication Data

US 2002/0127972 A1     Sep. 12, 2002

(30) Foreign Application Priority Data

Oct. 26, 2000   (GB) ................................. 0026209.7
Mar. 19, 2001   (GB) ................................. 0106695.0

(51) Int. Cl.
    *H04B 1/44*        (2006.01)
(52) U.S. Cl. ........................... 455/78; 455/76; 455/260
(58) Field of Classification Search .................. 455/78, 455/76, 118, 260, 262, 86; 327/100, 129, 327/105, 147, 156, 336
    See application file for complete search history.

(56) References Cited

U.S. PATENT DOCUMENTS

| | | | |
|---|---|---|---|
| 5,392,460 A | 2/1995 | Mattila et al. ................. 455/76 |
| 5,423,076 A * | 6/1995 | Westergren et al. ........... 455/86 |
| 5,619,154 A * | 4/1997 | Strolle et al. ................ 327/129 |
| 5,715,520 A | 2/1998 | Hillock et al. ................ 455/76 |
| 5,991,605 A | 11/1999 | Rapeli .......................... 455/76 |
| 6,404,293 B1 * | 6/2002 | Darabi et al. ................. 331/37 |

OTHER PUBLICATIONS

European Patent Application No. 99944448.2 + PHB 34277 filed with the USPTO on Aug. 19, 1999, U.S. Appl. No. 09/377,357, Inventors Paul R. Marshall et al.

* cited by examiner

*Primary Examiner*—Melur Ramakrishnaiah

(57) ABSTRACT

A radio transceiver capable of transmitting and receiving on a common radio channel in a half duplex mode includes a direct conversion transmitter and a low IF receiver. A common signal generator (2, 2', 2") comprises a first and second frequency generator (40, 41). The first frequency generator generates a carrier frequency signal which is used by both the transmitter and receiver. During reception, the second frequency generator generates an offset signal at the low IF frequency which is mixed with the carrier frequency signal to form a down conversion signal. During transmission, modulation is applied either directly to the carrier frequency signal in one embodiment, or to the offset signal which is then mixed with the carrier frequency signal to form a modulated carrier frequency signal in another embodiment.

9 Claims, 5 Drawing Sheets

Figure 1:
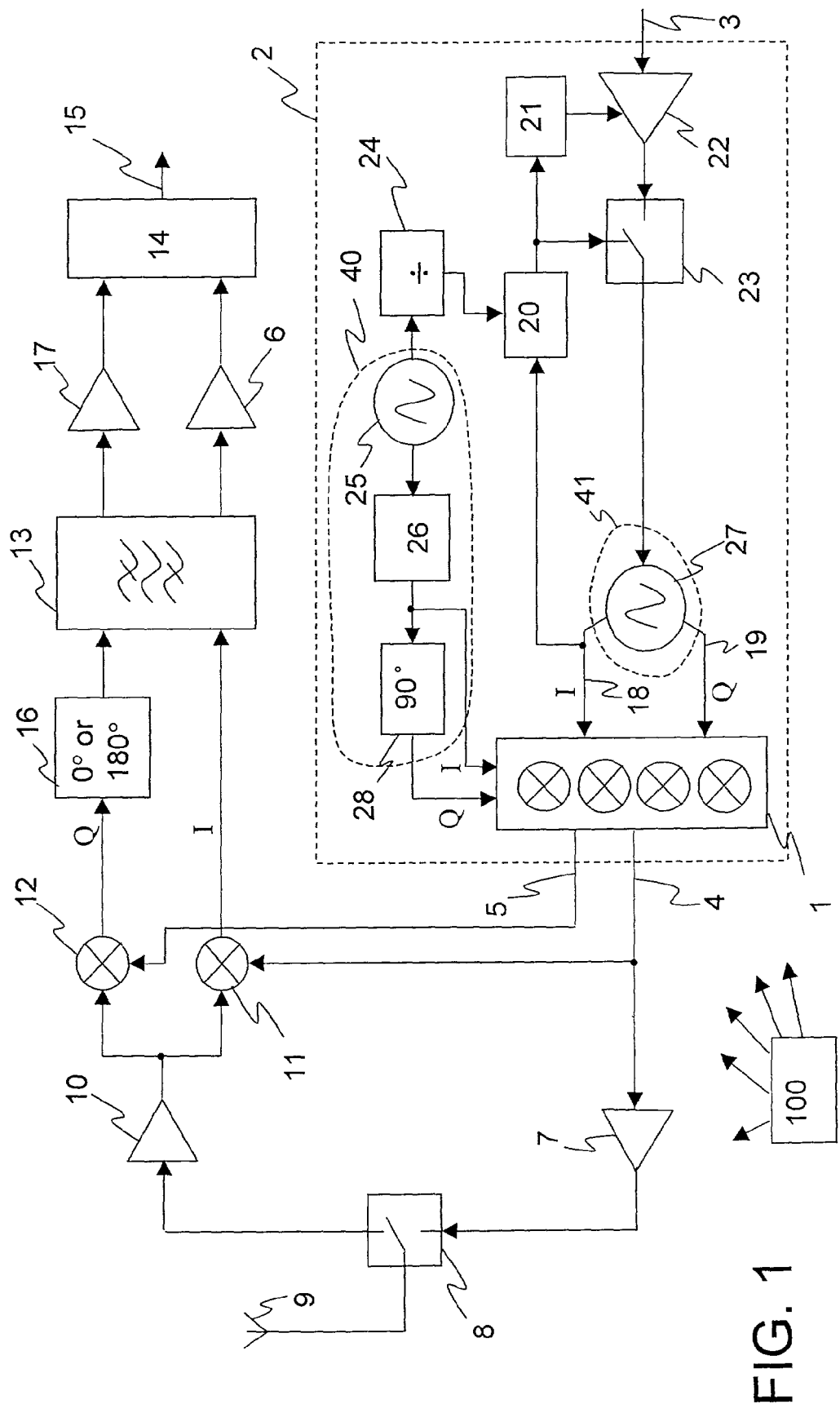

| Transceiver mode | VCO 27 | Second switchable inverter 36 | Output 4 | Output 5 | First switchable inverter 16 |
|---|---|---|---|---|---|
| Transmit with positive deviation | forward | non-invert | $\cos(\omega_c + \omega_o)t$ | not used | not used |
| Transmit with negative deviation | reverse | non-invert | $\cos(\omega_c - \omega_o)t$ | not used | not used |
| Receive with high side LO injection | forward | non-invert | $\cos(\omega_c + \omega_o)t$ | $\sin(\omega_c + \omega_o)t$ | non-invert |
| Receive with low side LO injection | forward | invert | $\cos(\omega_c - \omega_o)t$ | $\sin(\omega_c - \omega_o)t$ | invert |

FIG. 3

DIRECT CONVERSION RADIO TRANSCEIVER

The invention relates to a radio transceiver and an integrated circuit embodying a radio transceiver, each having a low IF receiver and a transmitter and suitable for use particularly, but not exclusively, in the 2.4 GHz ISM frequency band.

Radio networking standards such as FHSS 802.11 and SWAP-CA require the use of a CSMA (Carrier Sense Multiple Access) protocol in which a radio terminal requiring to transmit must, prior to transmitting, monitor the radio channel on which it wants to transmit to check that it is not being used by another radio terminal. If the channel is in use, the radio terminal will refrain from transmitting. The efficiency of a CSMA protocol is dependent on the speed at which a radio terminal can switch from receive mode to transmit mode. While it is switching it cannot receive and so cannot detect if another radio terminal starts to transmit, which may result in a clash of transmissions. A short receive/transmit switching time is desirable to minimise clashing, thereby maximising radio channel utilisation efficiency.

Radio standards such as FHSS 802.11 require the use of a Time Division Multiple Access protocol in which a radio terminal alternates between transmitting and receiving. Again, a short switching time between receiving and transmitting modes is desirable to minimise the dead time when the radio terminal cannot communicate.

One method of switching between modes is to employ separate local oscillators for the transmitter and the receiver, but this is expensive. A cheaper method of switching between modes is to retune a common oscillator, but this is slow.

The use of highly integrated transceiver architectures is desirable to achieve a low radio terminal cost. One receiver architecture which can be integrated readily is the low IF architecture using a polyphase IF filter. Such an architecture is described in European patent application No. 99944448.2 (unpublished at the date of filing the present invention). Low IF receivers using a polyphase IF filter can be susceptible to interference from a transmitter operating on a nearby frequency. This problem can be accentuated in radio frequency bands such as the 2.4 GHz ISM band where there is uncoordinated usage.

One solution for alleviating interference, which is disclosed in European patent application No. 99944448.2, is to switch local oscillator (LO) injection frequencies, thereby shifting the image frequency of the receiver. One method described in European patent application No. 99944448.2 for implementing this is to invert the LO signal injected for either the I (in-phase) or the Q (quadrature) component of the received signal.

It is desirable to reduce the cost of a transceiver by re-using circuits for the transmitter and receiver where possible. One transceiver architecture employing reuse is disclosed in U.S. Pat. No. 5,392,460 in which a reference frequency generator common to both transmitter and receiver is employed, however separate frequency synthesisers are used for the transmitter and receiver. In this prior architecture, modulation by an analogue signal is applied to the transmitter synthesiser prior to up-conversion and modulation by a digital signal is applied after up-conversion.

Another transceiver architecture also disclosed in U.S. Pat. No. 5,392,460 reuses the synthesiser which generates the receiver LO injection signal to also generate the transmitter LO injection signal, but combines this with a second, transmitter synthesiser to mix up to the final transmit carrier frequency. Again, modulation by an analogue signal is applied to the transmitter synthesiser prior to up-conversion and modulation by a digital signal is applied after up-conversion.

If either of these architectures disclosed in U.S. Pat. No. 5,392,460 were to be used to implement the technique of LO switching described in European patent application No. 99944448.2, or for CSMA, or for TDMA, this would entail switching the receiver synthesiser, which would be slow, resulting in an undesirable period during which reception is not possible.

An object of the invention is to provide an improved transceiver capable of fast switching times and reuse of components between the transmitter and receiver, and suitable for a high level of integration.

According to one aspect of the invention there is provided a half duplex radio transceiver adapted to transmit and receive on a common frequency, comprising a transmitter and a low IF receiver, further comprising signal generation means, the signal generation means comprising first and second frequency generators, wherein the first frequency generator generates a signal at a nominal carrier frequency during reception and transmission, wherein the second frequency generator generates an offset signal which during reception is at a low IF frequency, and wherein during reception the signal generated by the first frequency generator is combined with the offset signal to produce a down-conversion signal.

By using the first frequency generator to generate a signal at the carrier frequency for use by the transmitter and receiver for transmission and reception respectively without switching the frequency of the first frequency generator, transceiver switching times between transmit and receive modes can be kept short, and components can be reused between the transmitter and receiver. The difference between the carrier frequency and the frequency of the down-conversion signal of the receiver is provided by the second frequency generator. In some implementations the first and second frequency generators may use a common frequency reference source.

During transmission, modulation may be applied to either the first or second frequency generator.

In one embodiment of the invention, during transmission the signal at the nominal carrier frequency generated by the first frequency generator is directly modulated by an information signal.

In another embodiment, during transmission the offset signal generated by the second frequency generator is modulated by the information signal and the signal generated by the first frequency generator is modulated by the modulated offset signal, thereby producing a modulated carrier signal by indirect modulation of the carrier frequency signal.

In a further embodiment of the invention in which the modulation is applied to the second frequency generator, the second frequency generator is locked to a frequency reference during reception, a control signal to the locked second frequency generator is sampled during reception, and the sampled control signal is used to control the frequency modulation deviation during transmission.

The second frequency generator may optionally comprise a VCO or a numerically controlled oscillator (NCO).

In a further embodiment of the invention the receiver down-conversion signal can be switched between high side injection and low side injection. By this means interference on the image channel may be alleviated.

In a further embodiment of the invention the transceiver is implemented in an integrated circuit.

Figure 2:
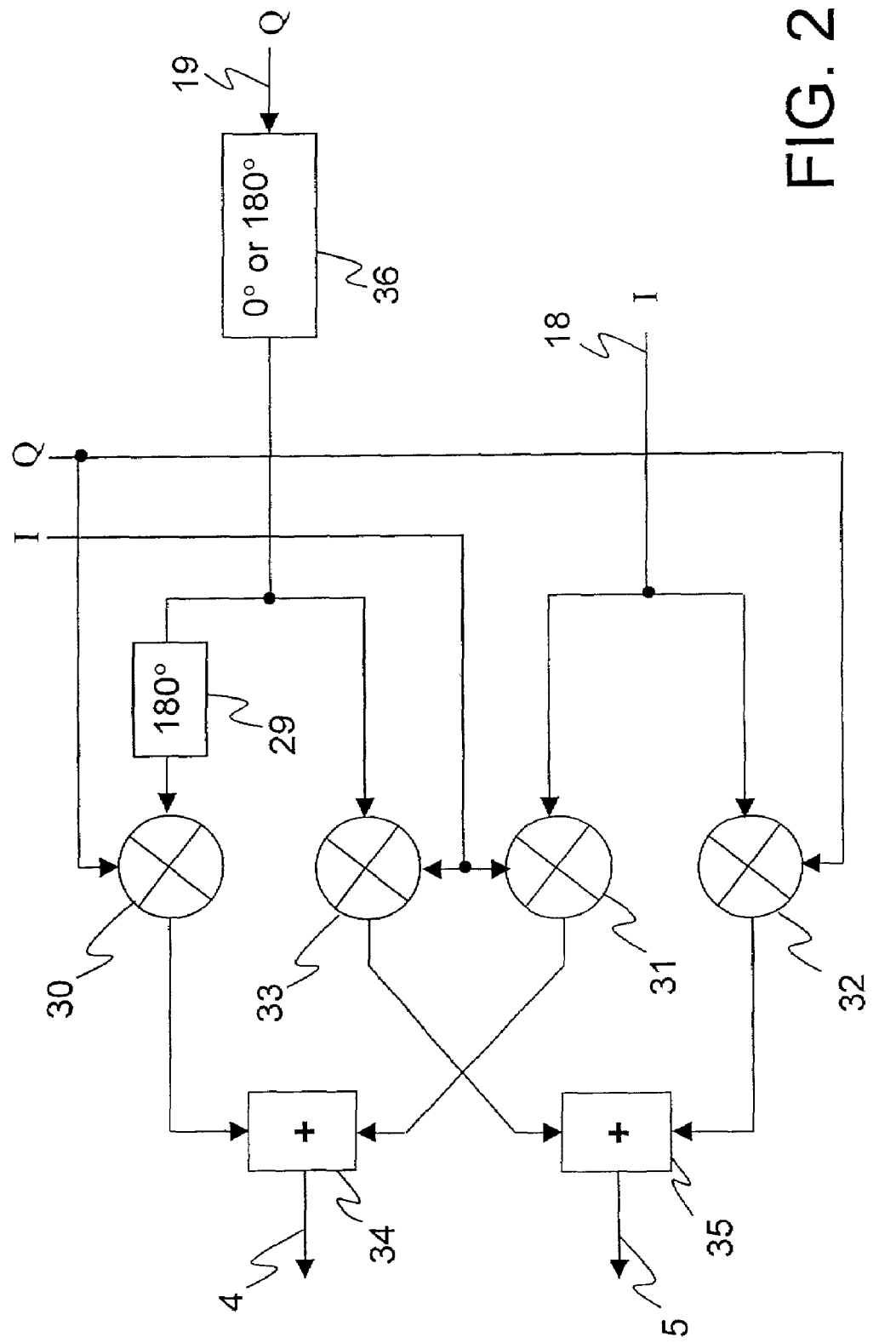
Figure 4:
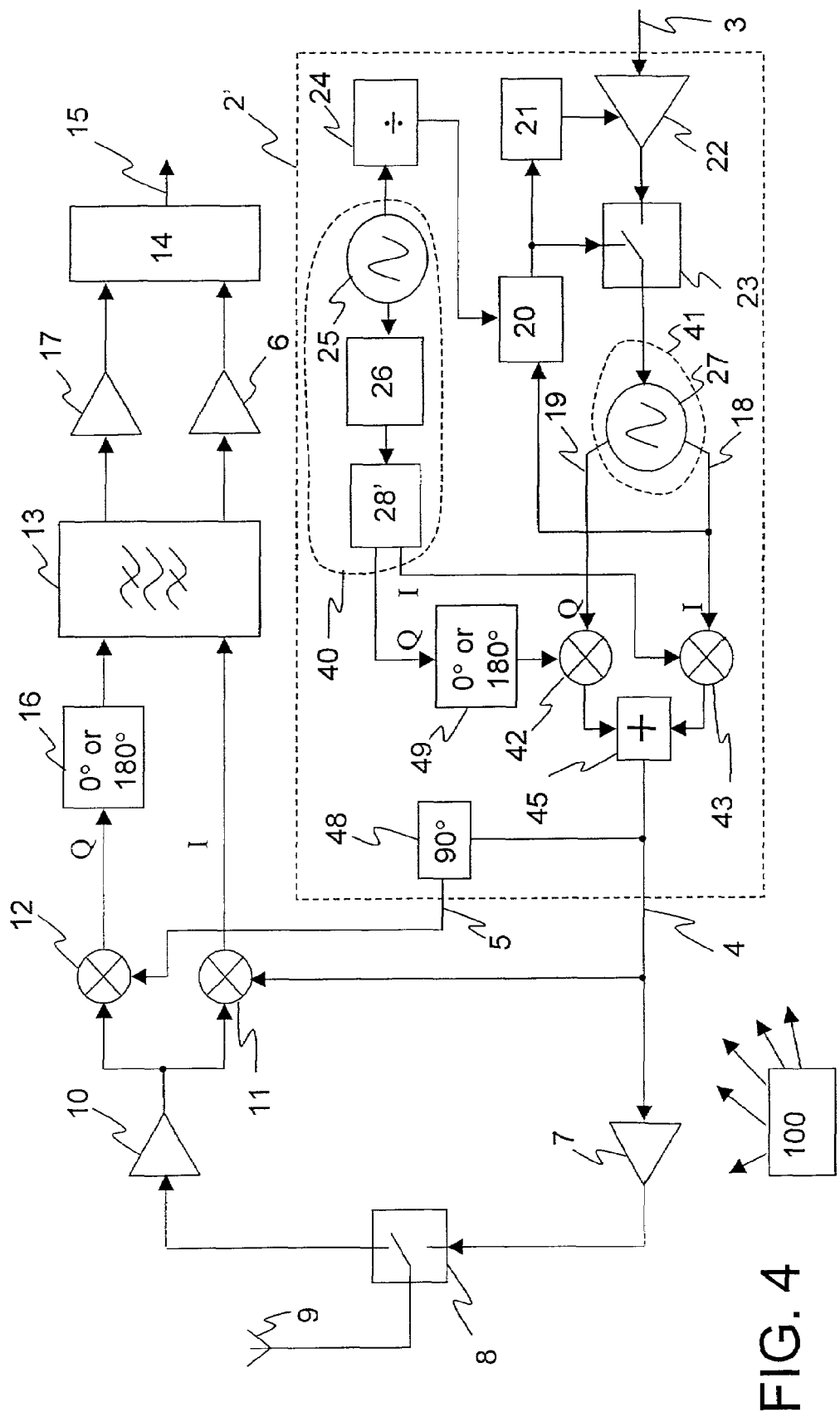

The invention will now be described, by way of examples, with reference to the accompanying drawings wherein;

FIG. 1 is a block schematic diagram of a first embodiment of a transceiver made in accordance with the invention, FIG. 2 is a block schematic diagram showing a complex mixer structure used in the transceiver shown in FIG. 1, FIG. 3 is a table of the transceiver settings required in transmit and receive modes for the transceiver shown in FIG. 1, and FIG. 4 is a block schematic diagram of a second embodiment of a transceiver made in accordance with the invention.

Figure 5:
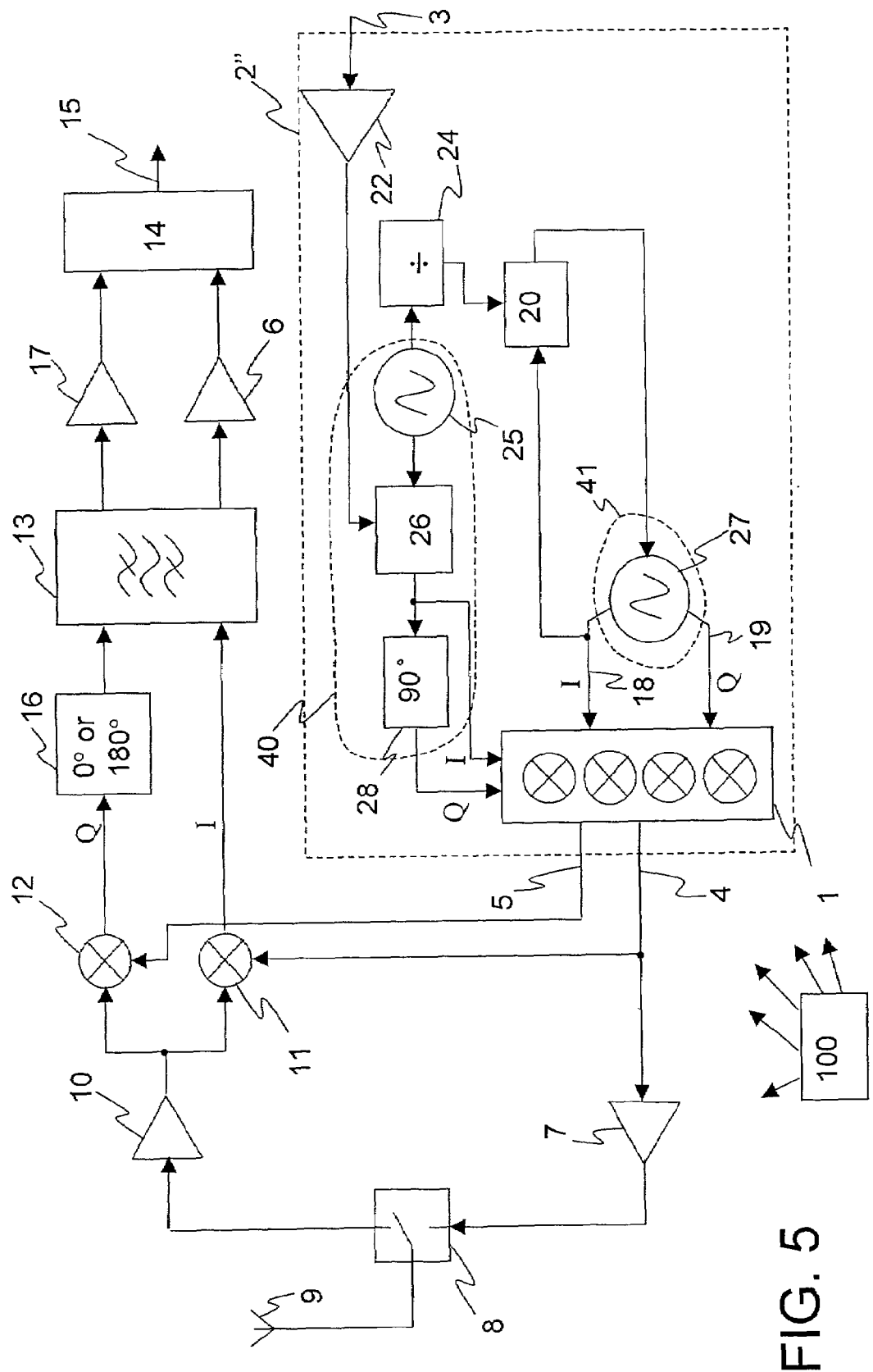

FIG. 5 is a block schematic diagram of a third embodiment of a transceiver made in accordance with the invention.

In the drawings, equivalent blocks have been labelled with the same reference numeral.

Three example embodiments will be described. Referring to FIG. 1 which illustrates the first embodiment, there is a signal generation means 2 having an input 3 for an input information signal that is to be transmitted, a first output 4 and a second output 5. The signal delivered to these outputs is dependent on the mode of operation of the transceiver, and is described below. The first output 4 of the signal generation means 2 is coupled to a transmitter power amplifier 7, the output of which is coupled to an antenna switch 8. The antenna switch 8 is also connected to a receiver amplifier 10 and the setting of the antenna switch 8 determines whether an antenna 9 is connected to the output of the transmitter power amplifier 7, when the transceiver is operating in a transmit mode, or to the input of the receiver amplifier 10, when the transceiver is operating in a receive mode. The operation of the antenna switch 8 is controlled by a control means 100.

The output of the receiver amplifier 10 is coupled to a first input of a first mixer 11 and to a first input of a second mixer 12. A second input of the first mixer 11 is coupled to the first output 4 of the signal generation means 2, and a second input of the second mixer 12 is coupled to the second output 5 of the signal generation means 2. An output from the first mixer 11, corresponding to the in-phase (I) component of the received signal, is coupled to a first, in-phase signal input of a polyphase IF filter 13. An output from the second mixer 12, corresponding to the quadrature (Q) component of the receiver signal, is coupled to a first switchable inverter 16, and an output from the first switchable inverter 16 is coupled to a second, quadrature signal input of the polyphase IF filter 13. First and second, in-phase and quadrature respectively, outputs from the polyphase filter 13 are coupled via respectively amplifiers 6 and 17 to in-phase and quadrature signal inputs respectively of a demodulator 14, which delivers a baseband information signal on an output 15.

The signal generation means 2 comprises a first frequency generator 40 and a second frequency generator 41. The structure of the signal generation means 2 will now be described together with its use to generate various signals required for the transceiver to operate in a transmit mode and in a receive mode.

The first frequency generator 40 comprises a frequency reference 25, such as a crystal oscillator, a carrier frequency synthesiser 26 and a first 90° phase shifter 28. An output of the frequency reference 25 is coupled to an input of the carrier frequency synthesiser 26 which generates an in-phase signal component $\cos \omega_c t$ at a nominal radio carrier frequency $\omega_c$ which is supplied to a first input of a complex mixer 1. The in-phase signal component $\cos \omega_c t$ is also supplied to the first 90° phase shifter 28 which generates a quadrature signal component $\sin \omega_c t$ at the nominal carrier frequency $\omega_c$ which is supplied to a second input of the complex mixer 1.

Alternatively, for fixed frequency applications, the first frequency generator 40 can comprise a fixed carrier frequency oscillator instead of the combination of frequency reference 25 and carrier frequency synthesiser 26.

The second frequency generator 41 comprises a voltage controlled oscillator (VCO) 27 which generates an in-phase signal component $\cos \omega_o t$ at a variable offset frequency $\omega_o$ on a first output 18 which is supplied to a third input of the complex mixer 1 and a quadrature signal component $\sin \omega_o t$ on a second output 19 which is supplied to a fourth input of the complex mixer 1. Furthermore, by controlling the voltage input to the VCO 27, the VCO 27 may be stopped from oscillating, and reversed such that the quadrature signal component on the second output 19 is inverted to become $-\sin \omega_o t$. Such a VCO is disclosed in International patent application PCT/EP00/00514.

Referring to FIG. 2 which shows the structure of the complex mixer 1, there is a third mixer 30, a fourth mixer 31, a fifth mixer 32 and a sixth mixer 33. A first input of the fourth mixer 31, and a first input of the sixth mixer 33, is coupled to accept the in-phase signal component $\cos \omega_c t$ at the radio carrier frequency $\omega_c$ (which is supplied to the first input of the complex mixer 1. A first input of the third mixer 30, and a first input of the fifth mixer 32, is coupled to accept the quadrature signal component $\sin \omega_c t$ at the radio carrier frequency $\omega_c$ which is supplied to the second input of the complex mixer 1.

A second input of the fourth mixer 31, and a first input of the fifth mixer 32, is coupled to accept the VCO in-phase signal component $\cos \omega_o t$ at the frequency $\omega_o$ which is supplied to the third input of the complex mixer 1.

The quadrature signal component $\sin \omega_o t$ delivered on the second output 19 from the VCO 27 to the fourth input of the complex mixer is coupled to a second switchable inverter 36 which can, under the operation of control means 100, deliver either the non-inverted or inverted version of the VCO quadrature signal component. The VCO quadrature signal component output from the second switchable inverter 36 is coupled to a second input of the sixth mixer 33 and to a non-switchable inverter 29. An output from the non-switchable inverter 29 is coupled to a second input of the third mixer 30.

The following products are formed and delivered at outputs of the third, fourth, fifth and sixth mixer outputs when the VCO 27 is running forwards (thereby delivering $\cos \omega_o t$ and $\sin \omega_o t$ at its first and second outputs 18 and 19 respectively) and second switchable inverter 36 is set to non-invert:

| | |
|---|---|
| Output of third mixer 30 = | $-\sin\omega_c t \times \sin\omega_o t$ |
| Output of fourth mixer 31 = | $\cos\omega_c t \times \cos\omega_o t$ |
| Output of fifth mixer 32 = | $\sin\omega_c t \times \cos\omega_o t$ |
| Output of sixth mixer 33 = | $\cos\omega_c t \times \sin\omega_o t$ |

An output of the third mixer 30 is coupled to a first input of a first summer 34 and an output of the fourth mixer 31 is coupled to a second input of the first summer 34. An output of the first summer 34 supplies the first output 4 of the complex mixer 1 and is the in-phase component of the carrier plus VCO frequency i.e.

$$[\cos \omega_c t \times \cos \omega_o t] - [\sin \omega_c t \times \sin \omega_o t] = \cos(\omega_c + \omega_o)t$$

when the VCO 27 is running forwards, thereby delivering $\sin \omega_o t$ at its second output 19, and second switchable inverter 36 is set to non-invert.

An output of the fifth mixer 32 is coupled to a first input of a second summer 35 and an output of the sixth mixer 33 is coupled to a second input of the second summer 35. An output of the second summer 35 supplies the second output 5 of the complex mixer 1 and is the quadrature component of the carrier plus VCO frequency i.e.

[ $\sin \omega_c t \times \cos \omega_o t$ ]+[ $\cos \omega_c t \times \sin \omega_o t$ ]=$\sin(\omega_c+\omega_o)t$ when the VCO 27 is running forwards, thereby delivering $\sin \omega_o t$ at its second output 19, and second switchable inverter 36 is set to non-invert.

When the second switchable inverter 36 is set to invert, with the VCO running forwards, the output of the first summer 34 supplies to the first output 4 of the complex mixer 1 the in-phase component of the carrier minus the VCO frequency i.e.

[ $\cos \omega_c t \times \cos \omega_o t$ ]+[ $\sin \omega_c t \times \sin \omega_o t$ ]=$\cos(\omega_c-\omega_o)t$ and the output of the second summer 35 supplies to the second output 5 of the complex mixer 1 the quadrature component of the carrier minus the VCO frequency i.e.

[ $\sin \omega_c t \times \cos \omega_o t$ ]−[ $\cos \omega_c t \times \sin \omega_o t$ ]=$\sin(\omega_c-\omega_o)t$ The signal components described above are used when the transceiver is in a receive mode, as will be described below. When the transceiver is in a transmit mode the second switchable inverter 36 is set to non-invert and the VCO 27 may optionally be reversed thereby delivering $\cos \omega_o t$ and $-\sin \omega_o t$ at its in-phase and quadrature, first and second outputs 18 and 19 respectively. In this case, the output of the first summer 34 supplies to the first output 4 of the complex mixer 1 the in-phase component of the carrier minus VCO frequency i.e.

[ $\cos \omega_c t \times \cos \omega_o t$ ]+[ $\sin \omega_c t \times \sin \omega_o t$ ]=$\cos(\omega_c-\omega_o)t$ In this way, reversing the VCO 27 has the effect of inverting the frequency deviation on the carrier signal. When the transceiver is in the transmit mode the signal delivered by the second output 5 of the complex mixer 1 is not used.

The signals generated at the first and second outputs 4 and 5 of the signal generation means 2 as required for transmit and receive modes, and the settings of the switchable inverters 16, 36, are summarised in the table of FIG. 3.

Referring again to FIG. 1, the frequency reference 25 is coupled to a divider 24 which divides the frequency reference signal down to a low IF. Typically the low IF is equal to half of the channel spacing, but other convenient frequencies may be used. An output of the divider 24 is coupled to a first input of a phase detector 20. The in-phase signal delivered by the first output 18 of the VCO 27 is coupled to a second input of the phase detector 20. An output of the phase detector 20 is coupled to a first input of a selector switch 23, and an output of the selector switch 23 is coupled to a voltage control input of the VCO 27.

An input information signal supplied to the input 3 of the signal generation means 2 is coupled to an input amplifier 22, and an output of the input amplifier 22 is coupled to a second input of the selector switch 23.

Further, the output of the phase detector 20 is coupled to a sample-and-hold circuit 21, and an output of the sample-and-hold circuit 21 is coupled to the input amplifier 22 to control the level of the input signal supplied to the voltage control input of the VCO 27.

When the transceiver is required to operate in receive mode with high side LO injection the following settings are made by control means 100.

a) The selector switch 23 is set to deliver to its output the signal delivered by the phase detector 20, thereby forming a control loop such that the VCO 27 is locked to the divided frequency reference signal at the low IF.

b) The VCO 27 runs forwards and the second switchable inverter 36 is set to non-invert, such that the generator 2 delivers on outputs 4 and 5 respectively the in-phase and quadrature components of the carrier plus offset frequency which are used as high side down-conversion signals by the first and second mixers 11 and 12 respectively.

c) The first switchable inverter 16 is set to non-invert.

If an interfering signal appears on the image channel the receiver is switched to low side LO injection by setting the first and second switchable inverters 16, 36 to invert. By switching the second switchable inverter 36, rather than reversing the VCO 27 to generate $-\sin \omega_o t$, disruption to the control loop, which could corrupt the received signal, is avoided. Depending on how the polyphase filter is implemented, some filter coefficients may need to be changed when switching LO injection.

Conversely, if interference appears on the image channel when the receiver is set for low side LO injection, the receiver can be switched to high side LO injection by setting the first and second switchable inverters 16, 36 to non-invert.

When the transceiver is required to operate in transmit mode the following setting are made by control means 100.

a) The selector switch 23 is set to deliver to its output the input information signal received from the input amplifier 22, thereby enabling the VCO 27 to be modulated by the input signal. The level of the input signal determines the frequency of the VCO 27 and hence the frequency deviation on the transmitted carrier signal.

b) The sample-and-hold circuit 21 is set to hold thereby enabling the voltage on the sample-and-hold circuit 21 which is sampled during receive mode now to act as a reference to control the input amplifier 22 and hence the frequency deviation provided by the VCO 27. In this way, tolerances in the VCO components are compensated for.

c) The second switchable inverter 36 is set to non-invert. The frequency of the signal delivered on the first output 4 of the signal generation means 2 is equal to the carrier frequency plus the deviation caused by the input information signal when the VCO 27 is running forwards, and is equal to the carrier frequency minus the deviation caused by the input information signal when the VCO 27 is running backwards.

If desired, the polarity of the deviation may be reversed by setting the second switchable inverter 36 to invert.

If the ability to switch between low and high side injection in the receiver is not required, the first and second switchable inverters 16, 36 may be omitted, being replaced by direct connections. Furthermore, the skilled reader will readily recognise that such a fixed injection may be set to either high side or low side by appropriate choice of signal polarity.

Referring to FIG. 4, in a second example embodiment, there is a signal generation means 2' having the input 3 for an input information signal that is to be transmitted, the first output 4 and the second output 5. Apart from differences in the internal structure of the signal generation means 2', the structure of the transceiver is the same as described for the first embodiment above, so only the differences in the structure of the signal generation means 2' will be described.

The method of generating in-phase and quadrature signal components cos $\omega_o t$ and sin $\omega_o t$ is the same as in the first embodiment shown in FIG. 1 and described above. The in-phase signal component cos $\omega_o t$ is coupled to a first input of a seventh mixer 43, and the quadrature signal component sin $\omega_o t$ is coupled to a first input of an eighth mixer 42.

In-phase and quadrature components at the carrier frequency, cos $\omega_c t$ and sin $\omega_c t$ respectively, are delivered from the first frequency generator 40 by the phase shifting circuit 28'. The in-phase component cos $\omega_c t$ is coupled to a second input of the seventh mixer 43, and the quadrature component sin $\omega_c t$ is coupled to a second input of the eighth mixer 42 via a third switchable inverter 49. An output from each of the seventh and eighth mixers 43, 42 is combined in a summer 45, and the resultant sum is delivered on the first output 4 of the signal generation means 2'. The resultant sum is routed through a second 90° phase shifter 48 and the resultant phase shifted sum is delivered on the second output 5 of the signal generation means 2'.

Coupling of the signal generation means 2' of the second example embodiment, by means of outputs 4 and 5, to the remainder of the transceiver is the same as the coupling of the signal generation means 2 of the first example embodiment shown in FIG. 1 and described above.

When the transceiver is transmitting the combination of the seventh and eighth mixers 43 and 42 and summer 45 form the well known direct up-conversion topology and delivers on the first output 4 of the signal generation means 2' a carrier frequency signal modulated by the input information signal.

When the transceiver is receiving, and the third switchable inverter 49 is set by control means 100 to non-invert, the combination of the seventh and eighth mixers 43 and 42 and summer 45 delivers on the first output 4 of the signal generation means 2' an in-phase component of a down-conversion signal, viz $$[\cos \omega_c t \times \cos \omega_o t] + [\sin \omega_c t \times \sin \omega_o t] = \cos(\omega_c - \omega_o)t$$

and after the phase shift in the second 90° phase shifter 48, a quadrature component of a down-conversion signal, cos $(\omega_c - \omega_o)t$, is delivered on the second output 5 of the signal generation means 2'.

In this way, down-conversion by low-side injection can be implemented. Also, when low-side injection is being used, the first switchable inverter 16 is set to invert to enable the polyphase filter 13 to select the required received signal.

In order to implement high side injection, the third switchable inverter 49 is set to invert, thereby resulting in cos$(\omega_c + \omega_o)t$ and sin$(\omega_c + \omega_o)t$ being delivered on the first and second outputs 4 and 5 respectively of the signal generation means 2', and the first switchable inverter 16 is set to non-invert.

Referring to FIG. 5, in a third example embodiment, there is a signal generation means 2" having the input 3 for an input information signal that is to be transmitted, the first output 4 and the second output 5. Apart from differences in the internal structure of the signal generation means 2", the structure of the transceiver is the same as described for the first embodiment above, so only the differences in the structure of the signal generation means 2" will be described. During transmission the input information signal is not applied to modulate the second frequency generator 41 but is instead applied to modulate the first frequency generator 40, for example by injecting the input information signal into the carrier frequency synthesiser 26 thereby modulating the carrier frequency signal directly. In this embodiment during transmission the second frequency generator 41 does not contribute to the modulation of the carrier frequency signal so the second frequency generator 41 may be stopped by control means 100 from oscillating or (not illustrated) the first and second outputs 4, 5 of the signal generation means 2 may be supplied directly with in-phase and quadrature components of the modulated carrier frequency signal delivered by the first frequency generator 40 instead of being supplied by the complex mixer 1.

In any of the example embodiments, optionally the second frequency generator 41 may be implemented as a numerically controlled oscillator (NCO) producing digital versions of the in-phase and quadrature components cos $\omega_o t$ and sin $\omega_o t$ which are then converted to the analogue domain by digital to analogue conversion and low pass filtering.

The skilled reader will readily recognise alternative locations for performing the signal inversion required when switching between low-side and high-side injection.

If the ability to switch between low-side and high-side injection is not required, the switchable inverters 16, 36, 49 may be omitted and replaced by direct coupling. Furthermore, the skilled reader will readily recognise that such a fixed injection may be set to either high side or low side by appropriate choice of signal polarity.

Optionally, the first frequency generator 40 can comprise an oscillator operating at a frequency higher than the nominal carrier frequency, for example at a frequency 2 $\omega_c$ and the phase shifting circuit 28' can comprise a division function, for example divide-by-two. This option is convenient for a digital implementation.

Optionally, although not illustrated, means may be provided to disable or disconnect transmitter portions of the transceiver when the transceiver is receiving, for example to prevent leakage from the transmitter into the receiver.

Optionally, the transmitter power amplifier 7, instead of being coupled to a single output of the signal generation means 2 (output 4 in the embodiments described above), may be supplied with the sum of the quadrature signals delivered on the first and second outputs 4, 5 of the signal generation means 2.

The invention claimed is:

1. A half duplex radio transceiver adapted to transmit and receive on a common frequency, comprising a transmitter and a low IF receiver, further comprising signal generation means, the signal generation means comprising first and second frequency generators, wherein the first frequency generator generates a signal at a nominal carrier frequency during reception and transmission, wherein the second frequency generator generates an offset signal which during reception is at a low IF frequency, and wherein during reception the signal generated by the first frequency generator is combined with the offset signal to produce a down-conversion signal, wherein the down conversion signal can be switched between high side and low side injection.

2. A transceiver as claimed in claim 1, wherein during transmission the signal generated by the first frequency generator is directly modulated by an information signal.

3. A transceiver as claimed in claim 1, wherein during transmission the offset signal is modulated by an information signal and the signal generated by the first frequency generator is modulated by the modulated offset signal thereby producing a modulated carrier signal.

4. A transceiver as claimed in claim 3, wherein the second frequency generator is locked to a frequency reference during reception, a control signal to the locked second frequency generator is sampled during reception, and the sampled control signal is used to control the frequency modulation deviation during transmission.

5. A transceiver as claimed in claim 3, wherein the second frequency generator comprises a voltage controlled oscillator.

6. A transceiver as claimed in claim 3, wherein the second frequency generator comprises a numerically controlled oscillator.

7. A transceiver as claimed in claim 1, wherein the first frequency generator comprises an oscillator operating at the nominal carrier frequency.

8. A transceiver as claimed in claim 1, wherein the first frequency generator comprises an oscillator operating at a frequency higher than the nominal carder frequency coupled to a division element which delivers in-phase and quadrature signal components at the nominal carrier frequency.

9. An integrated circuit comprising: a half duplex radio transceiver adapted to transmit and receive on a common frequency, said transceiver comprising a transmitter and a low IF receiver, further comprising signal generation means, the signal generation means comprising first and second frequency generators, wherein the first frequency generator generates a signal at a nominal carrier frequency during reception and transmission, wherein the second frequency generator generates an offset signal which during reception is at a low IF frequency, and wherein during reception the signal generated by the first frequency generator is combined with the offset signal to produce a down-conversion signal, wherein the down conversion signal can be switched between high side and low side injection.

* * * * *